United States Patent [19]

Smellie et al.

[11] 4,009,247
[45] Feb. 22, 1977

[54] PRODUCTION OF METAL CARBIDES

[75] Inventors: Allan M. Smellie, Mississauga; Hans G. Brandstatter, Welland, both of Canada

[73] Assignee: Ontario Research Foundation, Sheridan Park, Canada

[22] Filed: Jan. 7, 1975

[21] Appl. No.: 539,246

Related U.S. Application Data

[63] Continuation-in-part of Ser. No. 480,829, June 19, 1974, abandoned, which is a continuation-in-part of Ser. No. 386,019, Aug. 6, 1973, abandoned.

[52] U.S. Cl. .................................. 423/440; 75/84; 75/97 R; 75/101 R; 75/121
[51] Int. Cl.² .......................................... C01B 31/34
[58] Field of Search ................ 423/440/439; 75/84, 75/97 R, 101 R, 121; 27/71

[56] References Cited

UNITED STATES PATENTS

| 2,134,305 | 10/1938 | Kieffer ............................. 423/440 |
| 3,377,141 | 4/1968 | Hardy ............................. 423/440 |

FOREIGN PATENTS OR APPLICATIONS 545,494  8/1957  Canada ............................. 423/440

*Primary Examiner*—M. J. Andrews
*Attorney, Agent, or Firm*—Sim & McBurney

[57] ABSTRACT

Chromium or other metal carbides are recovered from chromates or equivalent soluble metal salts in substantially pure form by solid state carburization. The chromates may be derived from low grade ore to provide an overall non-smelting procedure which is non polluting. The carbide may be formed into sponge metal.

15 Claims, 1 Drawing Figure

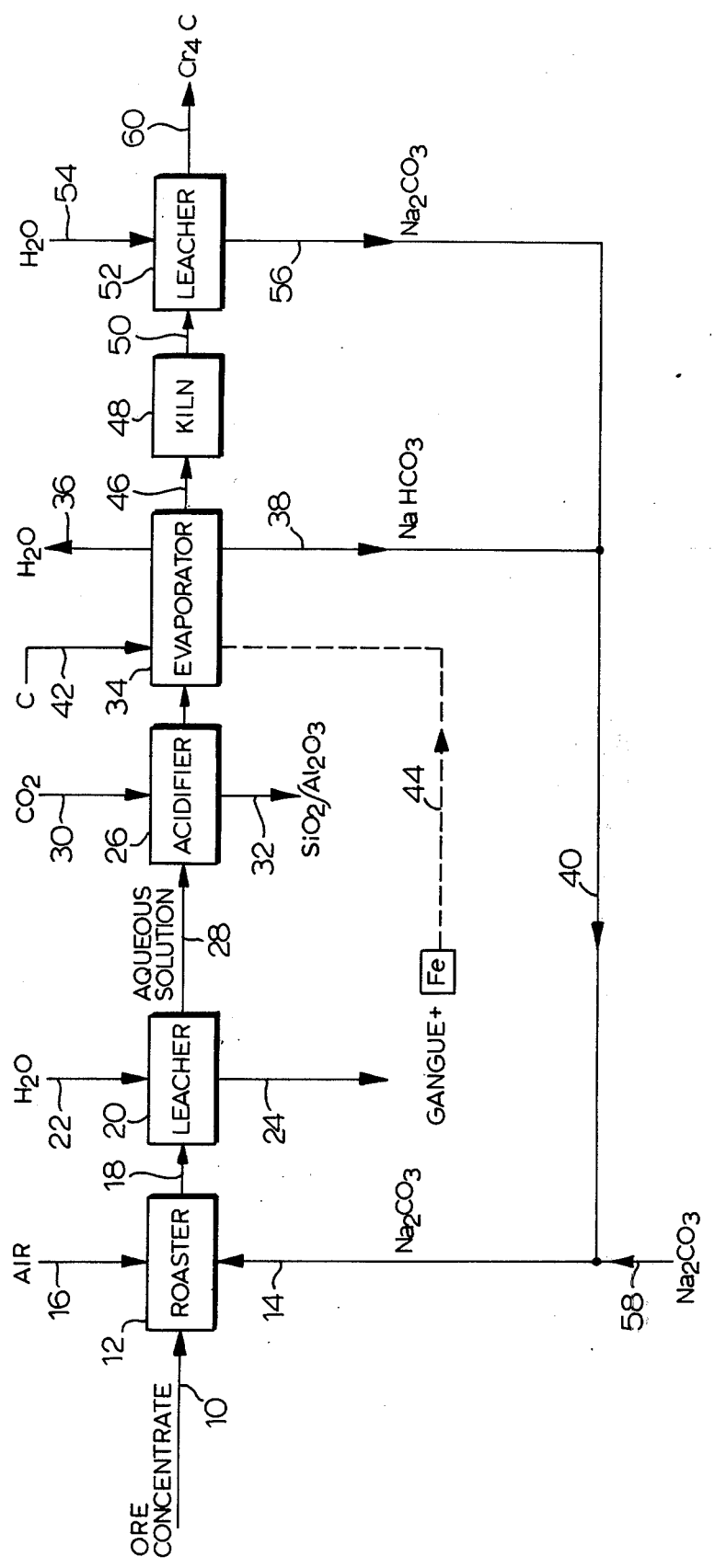

PRODUCTION OF METAL CARBIDES

REFERENCE TO RELATED APPLICATIONS

This application is a continuation-in-part of application Ser. No. 480,829 filed June 19, 1974 now abandoned which in turn is a continuation-in-part of application Ser. No. 386,019 filed Aug. 6, 1973 (now abandoned).

FIELD OF INVENTION

The present invention relates to the production of metal carbides, particularly from low grade ores.

BACKGROUND OF THE INVENTION

In the production of metals from ores, a smelting procedure using coke and a flux generally is practised, with liquid metal being tapped at intervals. These procedures require the use of high grade ores and high temperatures, and tend to emit noxious gases and particulate matter.

A particular metal recovered in this manner is chromium. Present practice requires the use of an ore having a chromium to iron ratio of at least 3 to 1 and attempts to use low grade chromite ores, of varying composition and having chromium to iron ratios typically 1 to 2:1, more typically 1.2 to 1.5:1, in smelting procedures have been unsuccessful.

High carbon ferrochrome alloys are used in steel making, containing typically 55 to 66% Cr, 7 to 8% C and the balance Fe, and conventionally are formed from high grade chromite ore using carbon as a reducing agent. Low carbon ferrochromium is produced from high grade ore and silicon chromium alloys as reducing agent. The present invention also makes it possible for the first time to form a substantially pure chromium carbide or a high carbon ferrochrome alloy from chromite ores for use as steel additives.

The present invention makes it possible for the first time to recover substantially pure chromium metal from chromite ores and concentrates without smelting and in particular to recover pure chromium metal from low grade chromite ores.

SUMMARY OF INVENTION

In the process of the present invention, a sodium chromate free from iron and other ore metal values, which first may be formed from a chromite ore, is formed directly into a chromium carbide or into chromium metal by an in situ solid state reduction of the chromate. By the use of solid state reactions, lower temperatures are required than in conventional smelting procedures and the process is essentially non-polluting.

While the invention will be described with particular reference to chromium materials, the invention also is applicable to the recovery of other metallic carbides and metals from ores containing the metal values. In particular, the invention is applicable to metals whose oxides or hydroxides are convertible into water soluble compounds on reaction with alkali wherein the metal is in the anionic moiety of the salt, for example, vanadium, niobium, tantalum, molybdenum, tungsten, uranium and manganese.

DETAILED DESCRIPTION OF INVENTION

The production of a pure sodium chromate from low grade chromite ores has been suggested heretofore, such as in "Utilization of Low Grade Domestic Chromite", by K. W. Downes et al., Department of Mines and Technical Surveys, Canada, Mines Branch, Memorandum No. 116, published 1951, "Extraction of Chromium from Egyptian Chromite Ores" by M. K. Hussein et al, Canadian Metallurgical Quarterly, Vol. 11, No. 3, (1972) p. 481 to 489, and "Chemistry of Chromium and its Compounds", Marvin J. Udy, Reinhold Publishing Corporation, New York, 1956, especially pages 265 to 273.

The chromite ore, typically a low grade chromite ore, or a concentrate thereof, is roasted under oxidizing conditions with alkali salts, typically sodium carbonate. Lime commonly also is incorporated in the roasted mixture to accelerate the oxidation procedure and to form insoluble compounds with part of the silica and alumina values of the ore. In this way, the chromium values are converted to soluble chromate. The iron values of the ore are not solubilized in this procedure and hence, on leaching of the roasted material with water, the solubilized chromium values are separated from the undissolved solid which contains the iron values, other unsolubilized values of the ore and insoluble compounds.

The alkali roast causes solubilization of at least some of the silica and alumina values in the ore and hence the aqueous solution resulting from the leach contains dissolved quantities of sodium silicate and sodium aluminate.

The pH of the solution is adjusted to a more acid value to cause precipitation of alumina and silica which are separated from the aqueous phase, which now is substantially free from dissolved alumina and silica values. The pH may be adjusted using sulphuric acid or carbon dioxide. It is preferred to use carbon dioxide since the alkali metal values of the silicate and aluminate remain as carbonate, which may be recovered later and recycled. When sulphuric acid is used, sodium sulphate remains in solution, which may be separated and sold if desired.

The aqueous solution remaining after separation of silica and alumina contains dissolved quantities of a sodium chromate. The form of the sodium chromate depends on the pH resulting from the acidification. At pH's of about 6, the sodium chromate is $Na_2CrO_4$ whereas at pH's of about 3, the sodium chromate is sodium dichromate $Na_2Cr_2O_7$.

Where the pH of the solution is lowered to provide the dichromate, it is preferred to evaporate the solution and preferentially crystallize sodium bicarbonate which is separated and recycled to the ore roasting. After removal of the bulk of the excess alkali values in this way, the chromate solution is slurried with powdered carbon and reacted to form chromium carbide. Residual soda ash is leached from the product and recycled to the roasting step.

Alternatively, where the pH of the solution is lowered to provide the chromate, it is preferred to slurry the solution with carbon, evaporate the slurry to dryness and form chromium carbide from the mixture by a solid state reaction. The soda ash may be separated from the chromium carbide for recycle.

The solid state reaction of the chromate of the carbide may be represented by the equation:

$$2Na_2Cr_2O_7 + 11C \rightarrow Cr_4C + 2Na_2CO_3 + 8CO \qquad (1)$$

The chromium carbide $Cr_4C$ is sometimes written, perhaps more accurately, as $Cr_{23}C_6$. In the present application the former nomenclature will be used. This chromium carbide is the member of a family of carbides, including $Cr_4C$, $Cr_7C_3$ and $Cr_3C_2$, which has the lowest carbon content and hence is the most acceptable product as a steel making additive where low carbon additions are required.

In order to promote interaction of the carbon with the chromate, it is preferred to provide the carbon in very finely divided form, preferably −300 mesh particle size and more preferably −400 mesh particle size.

The temperature employed in the reduction reaction may vary over a wide range, typically from about 1025° C to 1425° C or higher. Over this temperature range, the partial pressure of carbon monoxide formed varies widely from about 0.09 atmospheres at 1025° C to about 21.0 atmospheres at 1425° C and dictates to some extent the technique employed to remove the carbon monoxide. Removal of the carbon monoxide from the reaction vessel promotes the reduction reaction. At low partial pressures of carbon monoxide below about 0.1 atmospheres, experienced at the low end of the temperature range, vacuum may be used to remove the carbon monoxide. At higher partial pressures above about 0.1 atmospheres, the carbon monoxide may be flushed from the reaction vessel with an inert gas stream, such as argon.

It is preferred to flush the carbon monoxide from the reaction vessel by an inert gas stream, and hence the higher temperatures are used, generally above about 1200° C.

The reduction is continued until substantially complete reaction is achieved, generally involving a time span of about 2 to 4 hours for quantities of the order of 1 lb.

The precise form of the chromium carbide depends on the quantity of carbon used and the reaction temperature, since the lower temperatures promote the formation of lower carbon content carbides. Preferably, the amount of carbon employed corresponds to the stoichiometry of the above equation although other carbides, such as $Cr_3C_2$ and $Cr_7C_3$ may be formed at will by use of the appropriate quantity of carbon and temperature range.

The temperature ranges for the formation of other metallic carbides by similar solid state reductions may vary from the range recited above for the formation of chromium carbide. For example, the equivalent reduction of a permanganate to manganese carbide, $Mn_7C_3$ may be carried out conveniently in a rotary kiln at a temperature in the range of about 1125° C to about 1325° C, with the carbon monoxide being removed using an inert gas stream since the partial pressure of carbon monoxide increases from about 0.1 atmospheres at 1125° C to about 2.1 atmospheres at 1325° C.

The chromium carbide, if desired, may be reacted in a solid state reaction with chromium oxide to form sponge chromium in substantially pure form in accordance with the equation:

$$3Cr_4C + Cr_2O_3 \rightarrow 14Cr + 3CO \qquad (2)$$

The reaction of the chromium carbide with the chromium oxide may be carried out under a wide range of conditions. The reactants preferably are finely divided and intimately mixed by slurrying together and agglomerated.

The temperature used for the solid state reaction to form the sponge chromium depends on a number of factors, such as the carbide involved and the technique to be used for the removal of the carbon monoxide. Typically, a temperature in the range about 1300° to about 1750° C or higher may be used.

In the temperature range where partial pressures of carbon monoxide lower than 0.1 atmospheres result, a vacuum may be used to remove the carbon monoxide from the reaction vessel as it is formed. Where, however, the partial pressure of carbon monoxide exceeds about 0.1 atmospheres, then preferably the carbon monoxide is removed using an inert gas stream, such as argon.

For the reaction of $Cr_4C$ with $Cr_2O_3$ in accordance with equation 2, the partial pressure of carbon monoxide at 1525° C is about 0.1 atmospheres. Hence, the reaction temperature preferably exceeds about 1525° C and the carbon monoxide may be removed from the vessel, conveniently a rotary kiln, using an inert gas stream.

Higher temperatures result in shorter reaction times, and hence are preferred. However, the evaporation of chromium metal may become significant, typically above about 1700° C, and to reduce losses of product, a balance of reaction time with evaporative loss generally is chosen.

It is preferred, especially where highly volatile metals, such as manganese, are employed to position a condensation surface adjacent to the reactant mixture in order to condense any metallic vapour evolved during the reaction and hence eliminate the loss of product due to evaporation.

The preferred temperatures may vary from carbide to carbide and from metal to metal. For example, where manganese carbide and manganese oxide react to form manganese metal, in accordance with the equation:

$$Mn_7C_3 + 3 MnO \rightarrow 10 Mn + 3CO$$

the partial pressure of carbon monoxide is about $3.3 \times 10^{-4}$ atmospheres at 1100° C and about 0.3 atmospheres at 1625° C. While the reaction may be carried out at temperatures down to about 1100° C, vacuum usually is required to remove the carbon monoxide formed at temperatures below about 1350° since the partial pressure of carbon monoxide at about 1350° C is 0.01 atmospheres.

The reaction time required to produce the metal depends to a large degree on the temperature employed as well as particle size and uniformity of mixing, and tends to be short.

The formation of $Cr_4C$ is preferred when chromium metal is to be formed in accordance with this invention since less carbon is required to form the carbide from the oxide and less carbon monoxide requires to be removed in the formation of the metal than in the case when other chromium carbides are formed.

If desired, the chromate may be reduced directly to the metal by appropriate use of temperatures and carbon quantities, in accordance with the equation:

$$Na_2Cr_2O_7 + 5C \rightarrow 2Cr + Na_2CO_3 + 4CO$$

BRIEF DESCRIPTION OF DRAWING

The invention is described further, by way of illustration, with reference to the accompanying drawing which is a schematic flow sheet of one embodiment of the present invention.

DESCRIPTION OF PREFERRED EMBODIMENT

Referring to the drawing, a chromite ore concentrate, which first may be pelletized, is fed by line 10 to a roaster 12. The chromite ore concentrate may be a concentrated low grade chromite ore, the low grade ore typically containing 15 to 26% $Cr_2O_3$ and the concentrated ore typically about 38 to 45% $Cr_2O_3$, with a Cr:Fe ratio in concentrated ore of about 1.5. The ore is roasted in the roaster 12 of any convenient construction, such as, a rotary kiln, under any convenient conditions in admixture with sodium carbonate fed by line 14 to the roaster 12. The roasting is carried out in the presence of molecular oxygen which may be provided by air fed by line 16.

The roasting is carried out under conditions to oxidize substantially all the chromium values of the ore to sodium chromate, typically by roasting at about 850° C for about 2 hours.

The quantity of sodium carbonate added by line 14 to the roaster 12 is generally in excess of the quantity required to achieve the desired degree of solubilization of the solubilizable materials of the ore concentrate, including the chromium, aluminum and silicon values of the concentrates. This excess is used to ensure that the majority, and preferably substantially all, of the chromium values are converted to sodium chromate, with varying degrees of conversion of silica and alumina to their soluble form.

The roasted mixture, after cooling, quenching and crushing in any desired manner, is forwarded by line 18 to a leacher 20 wherein the roasted mixture is contacted with water fed by line 22 to dissolve soluble materials from the roasted mixture. The insoluble gangue components and the iron oxide values of the original concentrate are separated from the resulting leach liquor solution and removed from the leacher by line 24.

The leach liquor contains dissolved sodium salts, including the chromate, aluminate, silicate and carbonate. The carbonate is present due to the use of excess sodium carbonate in the roasting step. However, since substantially no iron values are solubilized during the roasting step, substantially complete separation of the chromium values from the iron values of the ore concentrate is achieved.

The leach liquor then is fed to a reactor 26 by line 28 and acidified therein by bubbling carbon dioxide therethrough fed by line 30. Preferably, the leach liquor has a temperature of about 5° to 10° C during the acidifying and the carbon dioxide is present as an atmosphere thereof at an elevated pressure. The acidification of the leach liquor achieved in this way causes precipitation of alumina and silica from the leach liquor. The precipitated alumina and silica are separated from the mother liquor and removed by line 32. The acidification may be continued to a pH at which the chromate ions are converted to dichromate ions, the solubility of sodium dichromate in aqueous solution being considerably greater than that of sodium chromate, while the sodium carbonate is converted into sodium bicarbonate. The leach liquor should be maintained at temperatures such as 5° to 10° C during the bubbling of the carbon dioxide therethrough.

The aqueous solution of sodium bicarbonate and sodium dichromate resulting from the acidifier 26 is evaporated in an evaporator 34, the evaporated water being collected by line 36. Differential crystallization of at least part of the sodium bicarbonate occurs and the sodium bicarbonate is removed by line 38 for recycle to the roaster 12 by line 40. Thereafter, powdered carbon is added to the mother liquor by line 42, together with part of the iron oxide recovered from the ore by line 24 if it is desired to form high carbon ferrochrome, as discussed in more detail below, the iron oxide being added by line 44. The mother liquor is slurried with the additives and evaporated to dryness to provide a solid intimate mixture of sodium dichromate, sodium bicarbonate, carbon and, possibly, iron oxide.

Where acidification only to a pH of about 6 occurs, the chromium values remain in the aqueous solution as sodium chromate while the bulk of the silica and alumina values present are precipitated and removed from the mother liquor. Separate crystallization of sodium carbonate generally is omitted, although a limited amount of sodium carbonate may be removed, if desired, by crystallization. The mother liquor is slurried with additives, as in the case of the sodium dichromate solution, and evaporated to dryness to provide a similar intimate mixture, in this case containing sodium chromate, sodium carbonate, carbon and, possibly, iron oxide.

The solid mixture then is forwarded by line 46 to a kiln 48 wherein the mixture is heated at an elevated temperature to effect a solid state reduction of the sodium dichromate to chromium carbide and sodium carbonate.

The solid mixture of chromic carbide and sodium carbonate, after cooling, if desired, is passed by line 50 to a leacher 52 wherein the sodium carbonate values are leached from the mixture by water fed by line 54 to leave substantially pure chromium carbide. Washing with dilute acid may be used to remove residual sodium carbonate and thereby further purify the chromium carbide product.

The aqueous solution of sodium carbonate resulting from the leaching in the leacher 52 is removed by line 56. The sodium carbonate values are recovered therefrom by crystallization and the solid sodium carbonate preferably is recycled to the sodium carbonate feed in line 14 as at least part thereof along with the sodium bicarbonate in line 40. Under ideal conditions, the quantity of sodium carbonate recovered from the solution in lines 38 and 56 is substantially the same as that fed to the ore concentrate by line 14. However, losses of sodium carbonate values may occur and hence it may be necessary to supplement the recycled sodium carbonate material with additional sodium carbonate by line 58 to provide the required amount in line 14.

The chromium carbide resulting from the leacher 52 is removed therefrom by line 60. Preferably, the quantity of carbon fed by line 42 is stoichiometrically equivalent to that required to form $Cr_4C$.

The chromium carbide, typically $Cr_4C$, recovered in line 60 may be used as a high chromium additive in steel making.

In the embodiment wherein iron oxide is included in the mixture fed to the kiln by addition by line 44, the product may be a high carbon ferrochrome alloy for use in steel making. The present invention in this embodiment allows the production, for the first time, of a high carbon ferrochrome from a low grade chromite ore without smelting.

EXAMPLES

The invention is illustrated by the following Examples:

EXAMPLE 1

This example illustrates the recovery of chromium values as sodium chromate from low grade chromite ores.

Bird River chromite ore concentrate analyzing 26.9% Cr (39.3% $Cr_2O_3$) and 22.4% total Fe was sized to 90% —200 mesh and was mixed with soda ash and lime similarly sized to —200 mesh. The mixture was pelletized to approximately ¼ inch diameter pellets and charged to a kiln through which air flowed. The pellets were formed from a total weight of 388g. chromite concentrate, 311g. soda ash, 194.3g. lime and 173.1g. water.

The pellets were heated for 2 hours up to the roasting temperature and were roasted at an average temperature of about 855° C for about 4 hours while about 18.4 SCFH of air passed through the kiln.

The pellets were allowed to cool after roasting and were quenched to room temperature. Thereafter, the pellets were crushed and the fine material obtained was added to about 2 liters of distilled water maintained at about 95° to 100° C. The roast product was slurried in the distilled water and was leached in three stages each of 2 hours duration. After each of the first two stages, the slurry was filtered and the residue was placed in a fresh quantity of hot, distilled water and leaching commenced again. The residue after the third stage was washed.

The resulting aqueous phase was concentrated and 354.6g of impure sodium chromate containing 72.7g of chromium, representing 63.9% $Na_2CrO_4$, the balance being soda ash and residual gangue material were recovered which was found to be substantially iron free.

The impure sodium chromate was dissolved in 465 ml of distilled water and cooled to 10° C. $CO_2$ gas was passed through a copper cooling oil immersed in a water bath held at about 5° C and then into the sodium chromate solution. The pH of the solution declined from about 13.2 to 8.9. The solid deposited in this process was filtered and the filtrate concentrated to deposit a solid material.

The solid recovered from the filtrate was found to contain 72.7% of the Cr values of the impure chromate and 27.9% Cr (86.9% $Na_2CrO_4$). The major impurity was 8.6% $NaHCO_3$.

EXAMPLE 2

This example illustrates the conversion of sodium chromate to chromium carbide.

A kiln charge of 340.4g of sodium chromate and 120.4g of —400 mesh graphite (95% fixed C) equivalent to 220% of the stoichiometric C requirement of the equation:

$$4Na_2CrO_4 + 9C \rightarrow Cr_4C + 4Na_2CO_3 + 4CO$$

was prepared and the kiln placed in a furnance preheated to 1000° C and nitrogen was passed through the kiln at a flow rate of about 50 ml/min. The kiln was rotated at about 5RPM and the charge temperature increased rapidly to 900° C in about 1 hour.

Thereafter, the furnace temperature was increased slowly to about 1270° C, increasing the charge temperature to about 1200° C. The nitrogen flow was maintained throughout the 6½ hour test operation. At the end of the test, the kiln was removed from the furnace and rapidly cooled to room temperature, the nitrogen flow being maintained during cooling.

The thermocouple sheath failed during the experiment and the sheath was observed to have a ¼ inch thick coating of a metallic deposit plus a small quantity of non-metallic material adhering to it. The sheath analyzed 28.9wt% Cr, 69.5% Fe and 4.6% C. The metallic portion of the sheath coating analyzed 90% $Cr_7C_3$.

SUMMARY

The present invention therefore provides a process for the production of chromium carbides from chromates, in turn preferably produced from low grade chromite ores, in high yield and in a non-polluting manner. The invention clearly is applicable to the production of other metals from low grade ores by the same procedures. Modifications are possible within the scope of the present invention.

What we claim is:

1. A process for the production of a chromium carbide, which comprises forming an intimate admixture of finely-divided carbon and sodium dichromate or sodium chromate, and reducing said sodium dichromate or sodium chromate with said carbon in a reaction zone to form a chromium carbide by an in situ solid state reaction at a temperature of about 1025° C to about 1425° C while carbon monoxide formed in said solid state reaction is removed from said reaction zone.

2. The process of claim 1 wherein said temperature is above about 1200° C and said carbon monoxide is removed by flushing an inert gas stream through said reaction zone.

3. The process of claim 1 wherein the quantity of carbon is sufficient to produce $Cr_4C$ as the carbide.

4. A process for the production of chromium carbide, which comprises:
    roasting a low grade chromite ore containing chromium, iron, aluminum and silicon values or a concentrate thereof with sodium carbonate in the presence of oxygen to solubilize substantially all the chromium and at least part of the aluminum and silicon values of said ore while leaving said iron values substantially unaffected;
    leaching said roasted ore to separate soluble compounds from gangue constituents including said iron values and the remainder of said aluminum and silicon values;
    acidifying the leach solution with carbon dioxide to a pH at which sodium dichromate and sodium bicarbonate are present in the leach solution and to cause deposition of said soluble aluminum and silicon values;
    separating the deposited materials from the acidified solution;
    partially evaporating the mother liquor from said separation step to crystallize only sodium bicarbonate therefrom;
    separating said crystallized sodium bicarbonate from the partially evaporated mother liquor;

slurrying finely divided carbon in said partially evaporated mother liquor;

evaporating the resulting slurry to dryness to form an intimate admixture of carbon, sodium dichromate and sodium carbonate;

reducing said sodium dichromate to a chromium carbide with said carbon by an in situ solid state reaction at a temperature of about 1025° C to about 1425° C in a reaction zone while the carbon monoxide formed in said reaction is removed from said reaction zone;

leaching the solid resulting from said reducing step to form an aqueous solution carbonate and leave said chromium carbide in the solid phase;

separating said chromium carbide from said sodium carbonate solution;

recovering solid sodium carbonate from said aqueous solution thereof; and recycling said recovered sodium carbonate and said separated crystallized sodium bicarbonate to said roasting step as at least part of the sodium carbonate utilized therein.

5. The process of claim 4 wherein said finely-divided carbon is graphite and has a particle size of $-300$ mesh.

6. The process of claim 5 wherein said finely-divided carbon has a particle size of $-400$ mesh.

7. The process of claim 4 wherein said solid state reaction temperature is above about 1200° C and said carbon monoxide is removed by flushing said reaction zone with an inert gas stream during said solid state reaction.

8. The process of claim 4 wherein the quantity of carbon present in said mixture is sufficient to produce $Cr_4C$ as said chromium carbide.

9. The process of claim 4 wherein lime is present during said roasting step to cause the bulk of said aluminum and silicon values to be insolubilized by said lime and to remain in said gangue constituents.

10. A process for the production of chromium carbide, which comprises:

roasting a low grade chromite ore containing chromium, iron, aluminum and silicon values or a concentrate thereof with sodium carbonate in the presence of oxygen to solubilize substantially all the chromium and at least part of the aluminum and silicon values of said ore while leaving said iron values substantially unaffected;

leaching said roasted ore to separate soluble compounds from gangue constituents including said iron values and the remainder of said aluminum and silicon values;

acidifying the leach solution with carbon dioxide to a pH at which sodium chromate and sodium carbonate are present in the leach solution and to cause deposition of said soluble aluminum and silicon values;

separating the deposited materials from the acidified solution;

slurrying finely-divided carbon in the mother liquor from said separation step;

evaporating the slurry to dryness to form an intimate admixture of carbon, sodium chromate and sodium carbonate;

reducing said sodium chromate to a chromium carbide with said carbon by an in situ solid state reaction at a temperature of about 1025° C to about 1425° C in a reaction zone while carbon monoxide formed in said reaction is removed from said reaction zone;

leaching the solid resulting from said reducing step to form an aqueous solution of sodium carbonate and leave said chromium carbide in the solid phase;

separating said chromium carbide from said sodium carbonate solution;

recovering solid sodium carbonate from said aqueous solution thereof; and recycling said recovered sodium carbonate to said roasting step as at least part of the sodium carbonate utilized therein.

11. The process of claim 10 wherein lime is present during said roasting step to cause the bulk of said aluminum and silicon values to be insolubilized by said lime and to remain in said gangue constituents.

12. The process of claim 10 wherein said finely-divided carbon is graphite and has a particle size of $-300$ mesh.

13. The process of claim 12 wherein said finely-divided carbon is graphite and has a particle size of $-400$ mesh.

14. The process of claim 10 wherein said solid state reaction temperature is above about 1200° C and said carbon monoxide is removed by flushing said reaction zone with an inert gas stream during said solid state reaction.

15. The process of claim 10 wherein the quantity of carbon present in said admixture is sufficient to produce $Cr_4C$ as said chromium carbide.

* * * * *